United States Patent
Punyko et al.

(10) Patent No.: US 7,966,438 B2
(45) Date of Patent: Jun. 21, 2011

(54) TWO-WIRE COMMUNICATIONS BUS SYSTEM

(75) Inventors: Arthur J. Punyko, St. Paul, MN (US); John T. Adams, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 518 days.

(21) Appl. No.: 11/862,618

(22) Filed: Sep. 27, 2007

(65) Prior Publication Data

US 2009/0086831 A1   Apr. 2, 2009

(51) Int. Cl.
*G06F 13/00* (2006.01)
*H04L 27/00* (2006.01)
*G05B 11/01* (2006.01)
*H02J 13/00* (2006.01)
*H04B 3/00* (2006.01)

(52) U.S. Cl. .............. 710/110; 710/107; 340/310.11; 340/825.52; 375/257; 375/259

(58) Field of Classification Search .......... 710/110, 710/107; 375/259, 257; 340/310.11, 825.52
See application file for complete search history.

(56) References Cited

U.S. PATENT DOCUMENTS

| | | | | |
|---|---|---|---|---|
| 4,359,731 A * | 11/1982 | Beauford et al. | ............ | 370/438 |
| 4,647,912 A * | 3/1987 | Bates et al. | .............. | 370/463 |
| 4,689,740 A * | 8/1987 | Moelands et al. | ............ | 713/600 |
| 4,721,870 A | 1/1988 | Rector et al. | | |
| 5,182,466 A * | 1/1993 | Ohkubo | ................ | 307/127 |
| 5,306,955 A * | 4/1994 | Fryer | ................ | 307/116 |
| 5,376,928 A * | 12/1994 | Testin | .............. | 710/105 |
| 5,400,017 A * | 3/1995 | Yoshisaka et al. | ........ | 340/825.59 |
| 5,495,240 A * | 2/1996 | Heberle | ............ | 340/870.13 |
| 5,548,240 A * | 8/1996 | Bayer | .......... | 327/432 |
| 5,559,502 A * | 9/1996 | Schutte | .......... | 340/825.21 |
| 5,729,204 A * | 3/1998 | Fackler et al. | .......... | 340/2.4 |
| 6,038,623 A * | 3/2000 | Schutte | ............ | 710/100 |
| 6,097,761 A * | 8/2000 | Buhring et al. | ............ | 375/257 |
| 6,822,555 B2 * | 11/2004 | Mansfield et al. | ........ | 340/538.11 |
| 7,071,727 B2 | 7/2006 | Ganton | | |
| 7,230,522 B2 * | 6/2007 | Stevens | ............ | 340/310.11 |
| 7,430,259 B2 * | 9/2008 | North et al. | .............. | 375/354 |
| 2002/0053970 A1 * | 5/2002 | Plummer | ............ | 340/310.01 |
| 2005/0268142 A1 * | 12/2005 | Saripalli et al. | ............ | 713/600 |
| 2008/0198908 A1 * | 8/2008 | Wagner | ........... | 375/219 |
| 2008/0244129 A1 * | 10/2008 | Tsai | .............. | 710/107 |
| 2009/0066381 A1 * | 3/2009 | Anderson et al. | ............ | 327/170 |

OTHER PUBLICATIONS

Dallas Semiconductor, DS1629 2-Wire Digital Thermometer and real time clock, Feb. 12, 2002.*
Honeywell, PVL6436A, PVL6438N, PUL6438 Programmable VAV/ Unitary Controllers, Installation Instructions, 24 pages, Dec. 2006.

(Continued)

*Primary Examiner* — Mark Rinehart
*Assistant Examiner* — Christopher A Daley
(74) *Attorney, Agent, or Firm* — Seager Tufte & Wickhem LLC

(57) ABSTRACT

A low-cost, two-wire, half-duplex high speed powered communications bus having a master/controller and one or more slave/sensor/interface units. The master/controller may have a current-limited power supply, and receive/transmit circuitry. Each slave/sensor/interface may have polarity protection and also have receive/transmit circuitry. The power supply may provide high/low voltage levels on the bus and over-current protection, and have one or more diodes for mis-wire protection. Each transmit circuit may have a tunable R-C network for limiting RF emissions. Each slave/sensor/interface may receive data and power over the two-wire bus.

18 Claims, 4 Drawing Sheets

OTHER PUBLICATIONS

Invensys, "MN-SXXX Series, MicroNet Sensors," 4 pages, Mar. 2002.

Aube, Drawings of Circuits 1 and 2, 2 pages, Date of Public Use or Disclosure Not Yet Determined as of May 28, 2008.

* cited by examiner

TWO-WIRE COMMUNICATIONS BUS SYSTEM

BACKGROUND

The invention pertains to communications and particularly to communication buses. More particularly, the invention pertains to such buses for control applications.

SUMMARY

The invention is a two-wire communications bus system for control applications. The system may have a master/controller connected with a bus to one or more polarity-insensitive slave/sensor units.

DESCRIPTION

A low-cost, 2-wire, high-speed powered communications bus may be desirable for building controls applications. The present system may contain several electronic circuits that provide a low-cost, 2-wire, half-duplex, high speed powered communications bus. The master/controller circuit may have a current-limited power supply and receive/transmit circuitry. The slave/sensor circuit may have receive/transmit circuitry and polarity protection. The use of an adjustable current source, with the programming resistors in series with a drive transistor, may set the high/low voltage levels on the bus. The current source may provide inherent over-current protection, and the diodes may provide mis-wire protection. Each transmit circuit may use a tunable R-C network to limit the radio frequency emissions (EMI/RFI). This may permit low-cost, high-speed data rates up to 9,600 and 19,200 baud. The slave/sensor circuit does not necessarily have a programmable current source. The slave/sensor circuit may have a diode bridge rectifier for polarity insensitivity. It may have the same receiver/transmit circuitry as that of the master/controller circuit.

Figure 1:
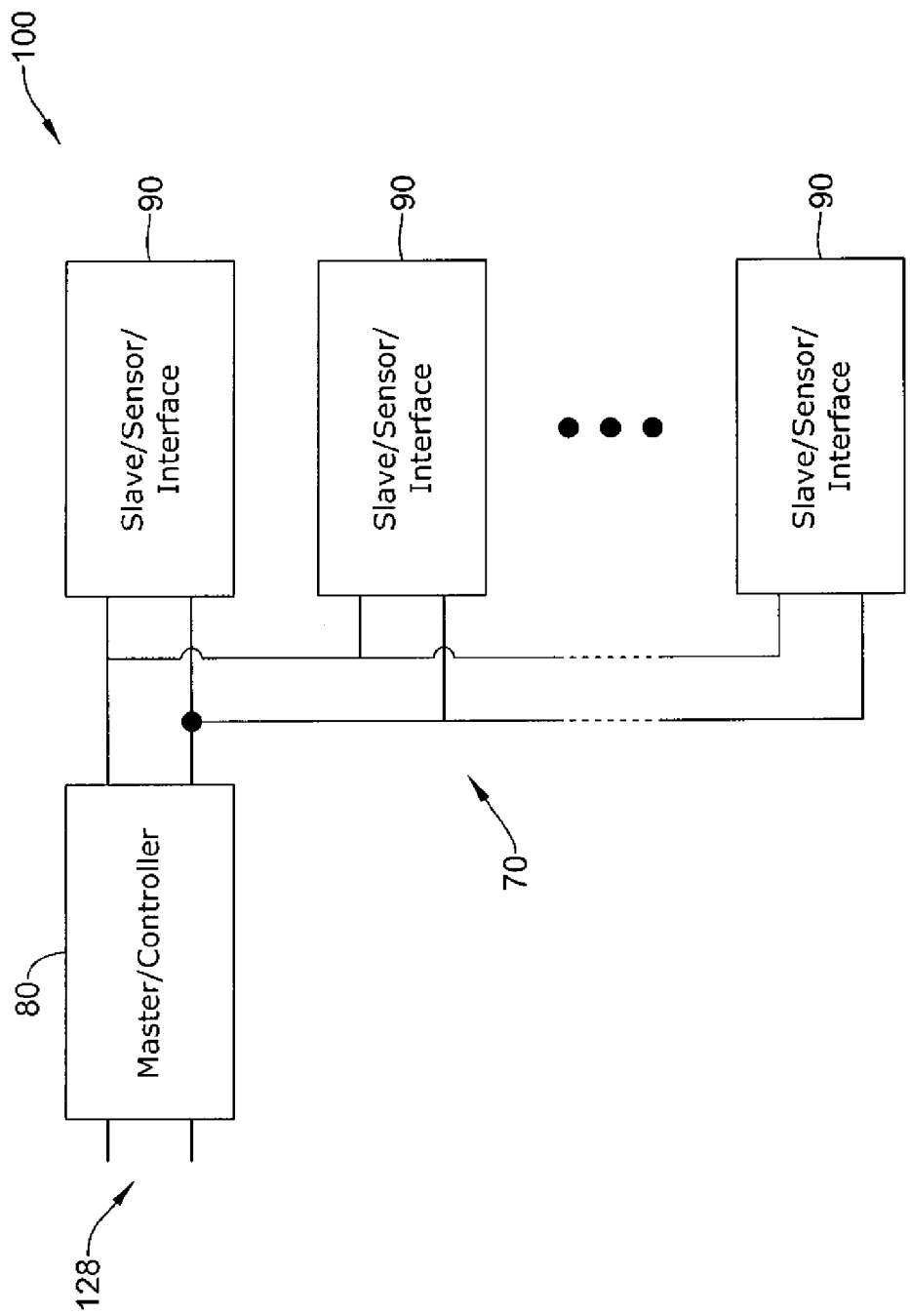
FIG. 1 is a diagram of a communications bus system.

FIG. 1 is an overall diagram of a system 100 having a communication bus 70, a master/controller 80 and a number of slave/sensor/interface modules or units 90. A slave module or unit 90 does not necessarily need to have a sensor and/or an interface. An interface of module or unit 90 may be a man-machine interface or other kind of interface. The master/controller 80 and the slave/sensor/interface units 90 may be interconnected with bus wires 70. The communications bus system 100 may be powered with about 24 volts AC via input leads 128 to master/controller unit or module 80.

Figure 2:
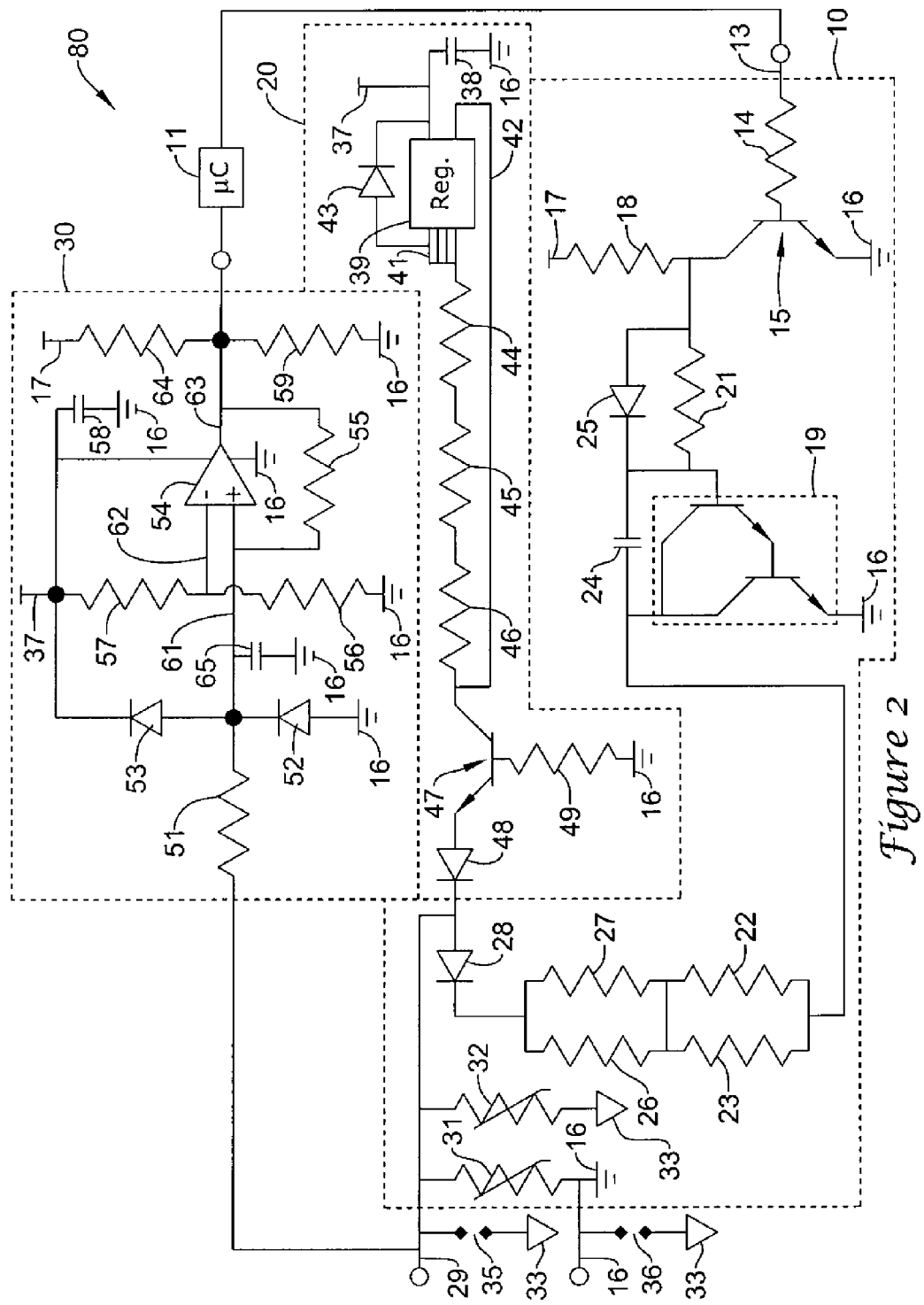
FIG. 2 is a diagram of a master/controller circuit.

FIG. 2 is a schematic of a master/controller 80 circuit of the present communications bus system 100. A microcontroller 11 (μC) may output a signal, such as for example a request for certain sensor data, to the transmit circuit 10 at input 13. The input may go through a resistor 14 to the base of an NPN bipolar transistor 15 having an emitter connected to a common master/controller ground or terminal 16. Terminal 16 is not necessarily connected to any common reference terminal 76 of a slave/sensor/interface 90. The collector may be connected to a voltage VCC 17 via a 511 ohm resistor 18. A signal at the collector of transistor 15 may go to a base of a first transistor of a Darlington arrangement 19 via a 511 ohm resistor 21. An emitter of the second transistor of the Darlington arrangement 19 may be connected to a ground 16. The collectors of the transistors of arrangement 19 may be connected to a first end of 75 ohm resistors 22 and 23 and to one end of a 0.001 microfarad capacitor 24. The other end of capacitor 24 may be connected to the base of the first transistor of arrangement 19, and connected to the cathode of a diode 25. The anode of diode 25 may be connected to the collector of transistor 15 to equalize the rise and fall times of the bus signals. Capacitor 24 may reduce the rate of change of the base current of transistor arrangement 19 and thus reduce the rise and fall times of the transmitted signals. This reduction in rise and fall times of the signals may keep RF noise at a minimum.

The second ends of resistors 22 and 23 may be connected to first ends of resistors 26 and 27. These first ends may also be connected to each other. The second ends of resistors 26 and 27 may be connected to the cathode of a diode 28. Resistors 26 and 27 may each be about 75 ohms. The anode of diode 28 may be connected to an output of a power supply circuit 20.

The anode of diode 28 may be connected to an output terminal 29 of the transmit circuit 10. Also, terminal 29 may be an input terminal to a receive circuit 30 for the master/controller circuit 80. The other terminal may be the ground or common reference 16 of the master/controller. The terminals 29 and 16 may be connected to the two wires, respectively, of bus 70. A surge arrestor 31 may be connected across terminal 29 and ground 16. A surge arrestor 32 may be connected across terminal 29 and another terminal 33 which may be an earth ground.

Across terminals 29 and 33 may be a spark gap 35. Across terminals 16 and 33 may be a spark gap 36. These gaps may be for static voltage protection of the circuits. Static-like tests may include 8K volts direct and 15K volts air discharge. An 800 volt surge test may be applied across the output terminals.

Circuit 20 may constitute a voltage source followed by a current source. Circuits 30 and 10 may provide signal level shifting. An AC supply of about 24 volts may be rectified and filtered to get about 21 volts DC which may be applied to a line or terminal 37 of circuit 20 for operation. A 0.1 microfarad capacitor 38 may be connected across terminal 37 and ground 16. Terminal 37 may be connected to a voltage input terminal of a voltage regulator 39. Regulator 39 may have a voltage output terminal 41. Also, regulator 39 may have a voltage adjust terminal 42. An example voltage regulator 39 may be an LM317. A diode 43 may be connected with the anode to output terminal 41 and the cathode to input terminal 37 of regulator 39. Three resistors 44, 45 and 46, having values of 1.5, 1.5 and 10 ohms, respectively, may be connected in series, having a first end of resistor 44 in the series connected to output terminal 41 of regulator 39. The other end of the series at resistor 46 may be connected to terminal 42 of regulator 39. Other resistor configurations may be used in lieu of the series-connected resistors 44, 45 and 46.

A transistor 47 may have a collector connected to terminal 42 and provide transient protection for regulator 39. Transistor 47 may be an STN790A. Also of transistor 47, an emitter may be connected to the anode of diode 48 and a base may be connected to one end of a resistor 49. The other end of resistor 49 may be connected to the ground 16. The cathode of diode 48, which might be regarded as the output of supply circuit 20, may be connected to terminal 29. The configuration of circuit 20 may operate as a current source limiting the output current to about 96 mA.

A receive circuit 30 may have an input that is connected to and common relative to terminal 29. This input may be connected to one end of a 10K ohm resistor 51. The other end of resistor 51 may be connected to the cathode of a diode 52, the anode of diode 53, a non-inverting input 61 of an operational amplifier 54, and one end of a 200K ohm resistor 55. Operational amplifier 54 may be an LM2903 and operated as a comparator. A 100 picofarad capacitor 65 may have one end connected to input or terminal 61 and the other end connected to ground 16. Capacitor 65 may provide low-pass filtering. The other end of resistor 55 may be connected to an output 63 of amplifier 54. The anode of diode 52 may be connected to ground 16. The cathode of diode 53 may be connected to the 21 volt DC terminal 37.

One end of a 17.8K ohm resistor 56 and one end of an 11.5K ohm resistor 57 may be connected to an inverting input 62 of amplifier 54. The other end of resistor 56 may be connected to ground 16. The other end of resistor 57 may be connected to the voltage terminal 37. Voltage terminal 37 may be connected to a positive supply terminal of amplifier 54 and one end of a 0.1 microfarad capacitor 58. The other end of capacitor 58 may be connected to ground 16. Also, the other power terminal of amplifier 54 may be connected to ground or terminal 16. A 20K ohm resistor 59 may have one end connected to the output 63 and the other end connected to terminal 16. A 10K ohm resistor 64 may have one end connected to the output 63 and the other end connected to a VCC voltage 17. Amplifier output 63 may be regarded as the output of the receive circuit 30. Output 63 may be connected to the microcontroller 11.

Figure 3:
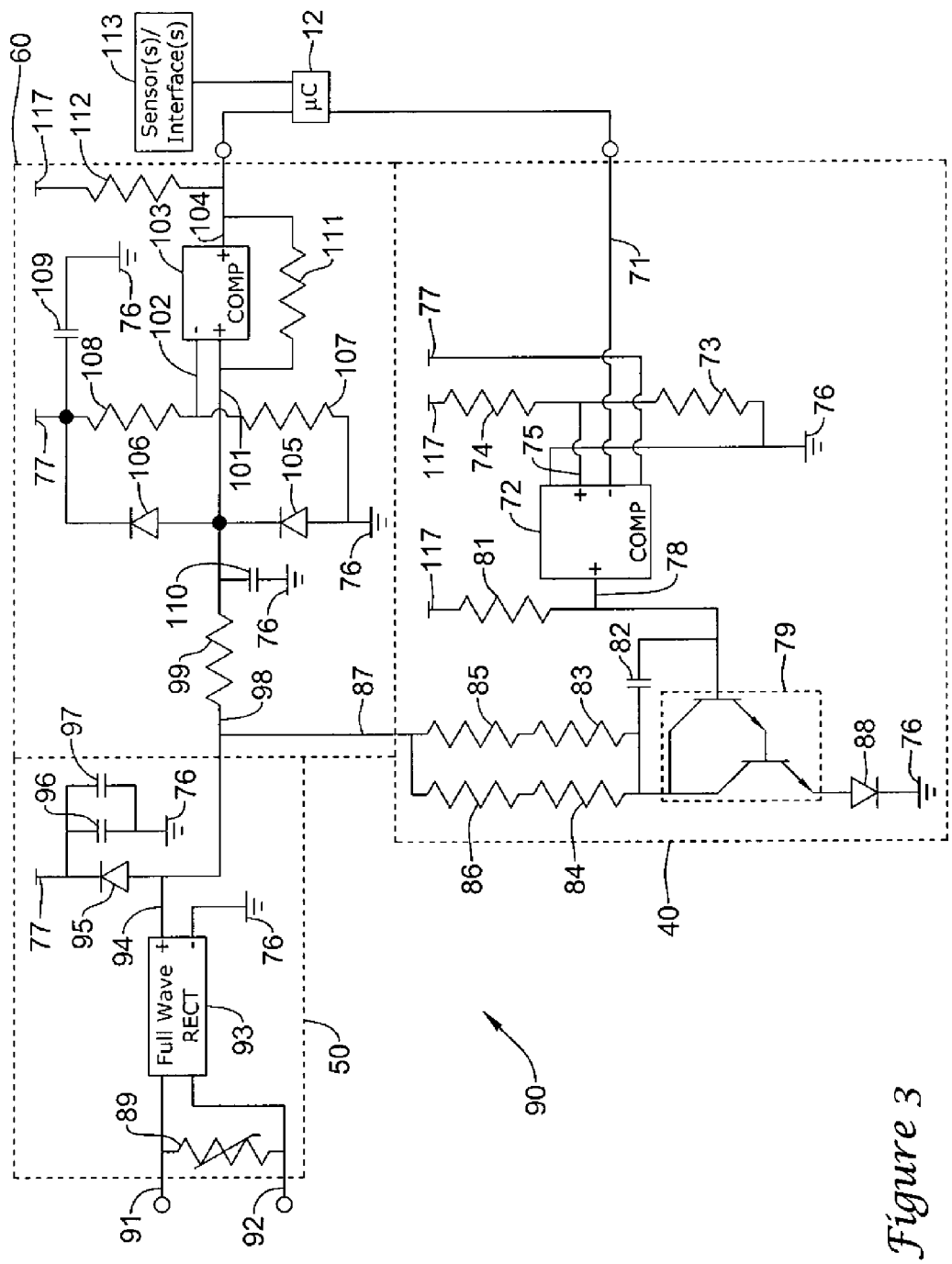
FIG. 3 is a diagram of a slave/sensor circuit.

FIG. 3 is a schematic of a slave/sensor/interface 90 circuit of the present communication bus system 100. A micro controller 12 may be connected to an input 71 of a transmit circuit 40 for providing data signals to it. Input 71 may be connected to an inverting input of a comparator 72. Component 72 may be an LM2903. A 10K ohm resistor 73 may have one end connected to a non-inverting input 75 and the other end connected to a slave/sensor/interface reference terminal 76. A 7.32K ohm resistor 74 may have one end connected to the non-inverting input 75 and the other end connected to the voltage 117. Reference terminal 76 and voltage 77 may be connected to the comparator 72 as a power source.

An output 78 of comparator 72 may be connected to one end of a 4.75K ohm resistor 81. The other end of resistor 81 may be connected to voltage 117. Output 78 may also be connected to a base input of a first transistor in a Darlington circuit 79 of two NPN transistors. The output 78 may also be connected to one end of a 0.001 microfarad capacitor 82. A selection of a capacitor 82 value along with associated resistor values may provide a tuning to reduce RF emissions. The other end of capacitor 82 may be connected to the collectors of circuit 79, one end of a 75 ohm resistor 83 and one end of a 75 ohm resistor 84. The other end of resistor 83 may be connected to one end of a 75 ohm resistor 85. The other end of resistor 84 may be connected to one end of a 75 ohm resistor 86. The other ends of resistors 85 and 86 may be connected together as an output 87 of the transmit circuit 40. An emitter of a second transistor of the Darlington circuit 79 may be connected to the anode of a diode 88. The cathode of diode 88 may be connected to reference 76.

An interface circuit 50 of the slave/sensor/interface 90 may be connected to the communications bus 70 with two wires 91 and 92. It can be noted that wires 29 and 16 of master/controller 80 may be connected to bus 70. Wires 29 and 16 may correspond to wires 91 and 92, or to wires 92 and 91, respectively. The input to slave/sensor/interface unit or units 90 may be polarity insensitive. Power for unit 90 may come in from bus 70. A surge arrestor 89 may be connected across wires or terminals 91 and 92. These wires 91 and 92 may be connected to a full-wave bridge rectifier 93, which may be a DF02S. A negative terminal of rectifier 93 may be connected to the reference terminal 76. A positive terminal 94 may be connected to the anode of a diode 95. The cathode of diode 95 may be connected to provide a voltage or power (WMBPWR) to terminal 77 for the slave/sensor/interface circuit 90. One end of a 0.1 microfarad capacitor 96 may be connected to the cathode of diode 95. The other end of capacitor 96 may be connected to ground 76. One end of a 220 microfarad capacitor 97 may be connected to the cathode of diode 95. The other end of capacitor 97 may be connected to ground 76. Capacitor 96 may be better suited to filter out sharp spikes while the larger capacitor 97 may be appropriate for filtering out larger but slower variations in voltage magnitude.

The terminal 94 of circuit 50 may be connected to an input 98 of a receive circuit 60. Also, the output 87 of transmit circuit 40 may be connected to terminal 94 and input or terminal 98. One end of a 10K ohm resistor 99 may be connected to terminals 98, 87 and 94. The other end of resistor 99 may be connected a non-inverting input or terminal 101 a comparator 103. Comparator 103 may be an LM2903. Terminal 101 may be connected to the cathode of a diode 105, the anode of diode 106 and one end of a 100 picofarad capacitor 110. The anode of diode 105 may be connected to reference 76 and the cathode of diode 106 may be connected to the voltage terminal 77. The other end of capacitor 110 may be connected to ground 76. Capacitor 110 may provide low-pass filtering.

One end of a 17.8K ohm resistor 107 may be connected to an inverting input or terminal 102 of comparator 103. The other end of resistor 107 may be connected to reference 76. A first end of a 5.49K ohm resistor 108 may be connected to terminal 102. The other end of resistor 108 may be connected to voltage 77. One end of a 0.1 microfarad capacitor 109 may be connected to the other end of resistor 108. The other end of capacitor 109 may be connected to reference 76. A first end of a 200K ohm resistor 111 may be connected to terminal 101 and the other end of resistor 111 may be connected to a terminal 104 which is an output of comparator 103. One end of a 10K ohm resistor 112 may be connected to terminal 104 and the other end of resistor 112 may be connected to a 5 volt DC terminal 117. The 5 volts may be derived from the voltage on terminal 77. Terminal 104 may be regarded as an output of the receive circuit 60 and connected to microcontroller 12. The output of terminal 104 may be a request for data to microcontroller 12. The request may come from the master/controller 80. One or more sensors 113 and/or interfaces 113 may be connected to and provide data or information to or from controller 12, relative to transmitting via terminal 71, transmit circuit 40, interface 50 and bus 70 to the master/controller 80, and relative to receive circuit 60. An interface 113 may be a man-machine interface or other kind of interface.

Figure 4:
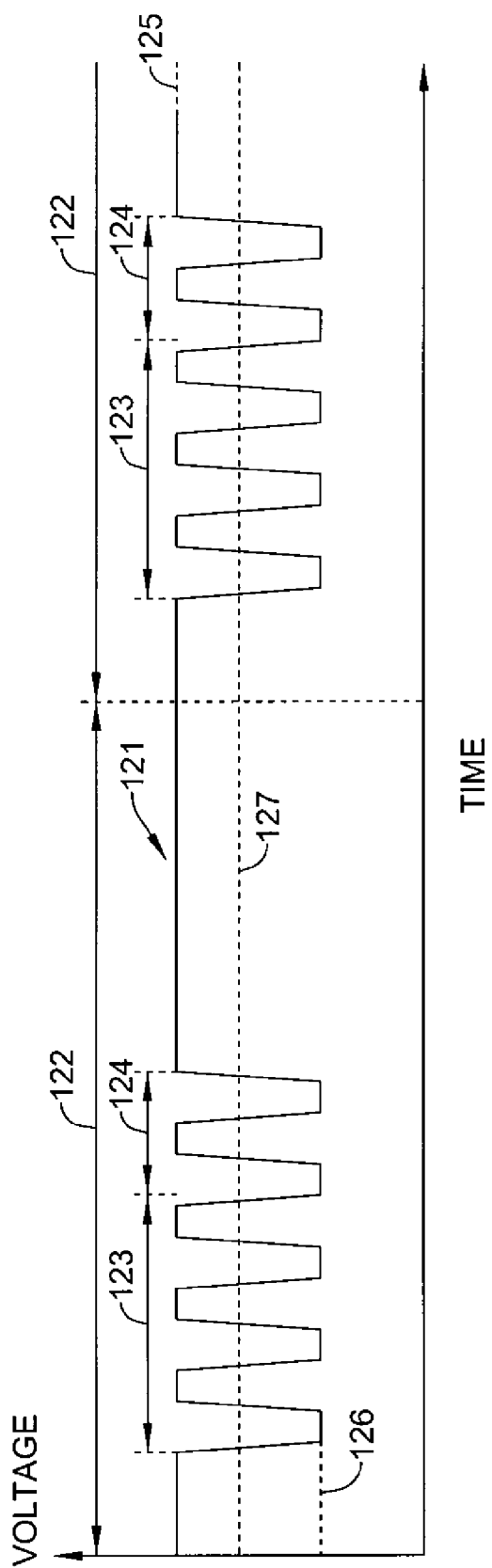
FIG. 4 is an example waveform on the bus of the system.

FIG. 4 is an example of a waveform 121 on the bus 70. The period 122 of waveform may be regarded as one cycle of data and power. Signals over time 123 may represent data or information from the master/controller 80. Signals over time 124 may represent data or information from a slave/interface/sensor 90. The voltage level of waveform at magnitude 125 may be about 18 volts. The voltage level, at the lower part of the signals, at magnitude 126 may be about 8 volts. The voltage level at magnitude 127, which might represent the average voltage of the waveform 121, may be about 15 volts. Besides carrying data and/or information signals, the waveform 121 may provide sufficient power for operation of one or more slave/sensor/interface modules 90.

In the present specification, some of the matter may be of a hypothetical or prophetic nature although stated in another manner or tense.

Although the invention has been described with respect to at least one illustrative example, many variations and modifications should become apparent to those skilled in the art upon reading the present specification. It is therefore the intention that the appended claims be interpreted as broadly as possible in view of the prior art to include all such variations and modifications.

What is claimed is:

1. A communications bus system comprising:
 a master circuit;
 at least one slave circuit; and
 a two-wire bus interconnecting the master circuit and the at least one slave circuit;
 wherein the at least one slave circuit includes an interface circuit disposed between the two-wire bus and other circuits of the at least one slave circuit, the interface circuit comprising a full-wave rectifier configured to rectify a signal received from the two-wire bus, thereby providing polarization insensitivity to the at least one slave circuit.

2. The system of claim 1, wherein each of the at least one slave circuits comprises one or more sensors and/or man-machine interfaces.

3. The system of claim 1, wherein each of the at least one slave circuits comprises:
 a transmit circuit connected to the interface circuit and one or more sensors and/or man-machine interfaces; and
 a receive circuit connected to the interface circuit and the transmit circuit.

4. The system of claim 3, wherein the transmit circuit of the at least one slave circuit comprises a resistor-capacitor network for controlling rise and fall times of signals from the transmit circuit.

5. The system of claim 1, wherein the master circuit comprises:
 an interface circuit;
 a current source connected to the interface circuit;
 a transmit circuit connected to the current source and the interface circuit; and
 a receive circuit connected to the interface circuit and the current source.

6. The system of claim 5, wherein the transmit circuit of the master circuit is for providing a soft start of transmitted signals to reduce electromagnetic interference (EMI).

7. The system of claim 5, wherein the current source of the master circuit comprises:
 a voltage source; and
 a current control circuit connected to the voltage source.

8. The system of claim 1, wherein:
 the bus is for conveying signals; and
 the bus is for conveying electrical power.

9. A master and slave communication system comprising:
 a controller;
 at least one sensor module; and
 a bus connected to the controller and the sensor module; and
 wherein:
 the bus is a two-wire connection for communications and power;
 the sensor module comprises a polarization insensitive circuit; and
 the polarization insensitive circuit comprises a diode bridge rectifier for insensitizing polarity of signals received from the bus by the sensor module.

10. The system of claim 9, wherein:
 the controller comprises a transmit circuit; and
 the transmit circuit comprises a resistor-capacitor-transistor circuit for reducing rise and fall times of transmitted signals.

11. The system of claim 10, wherein the reducing the rise and fall times of the signals minimizes electromagnetic noise of the system.

12. The system of claim 9, wherein the controller comprises:
 a static voltage discharge circuit; and
 a voltage surge protection circuit.

13. The system of claim 9, wherein:
 the sensor module comprises a resistor-capacitor-transistor circuit for reducing electrical noise of signals being provided to the bus; and
 the sensor module is connected to one or more sensors.

14. A communications bus comprising:
 a control module;
 at least one slave module; and
 a two-wire connection between the control module and the at least one slave module; and
 wherein:
 the at least one slave module includes a diode bridge rectifier configured to render the at least one slave module polarization insensitive to signals received via the two-wire connection; and
 the control module comprises a transmit circuit having a tunable resistor-capacitor network for limiting radio frequency emissions.

15. The bus of claim 14, wherein the control module comprises an adjustable current source having a programmable resistance for setting high and low voltage levels for signals and power on the bus.

16. The bus of claim 15, wherein the adjustable current source comprises:
 an output; and
 at least one diode connected to the output for providing mis-wire protection.

17. The bus of claim 14, wherein the adjustable current source is for providing a limited amount of current to result in over-current protection for the control module, the slave module and/or the bus.

18. The bus of claim 14, further comprising:
 a first microcontroller connected to the control module; and
 a second microcontroller connected to the slave module; and
 wherein:
 the first microcontroller is for requesting sensor data and receiving sensor data via the slave module, the two-wire connection and the control module; and
 the second microcontroller is for interfacing the slave module with the at least one sensor.

* * * * *